(12) United States Patent
Delos Reyes et al.

(10) Patent No.: US 8,554,933 B2
(45) Date of Patent: Oct. 8, 2013

(54) DYNAMIC SELECTION OF PACKET DATA NETWORK GATEWAYS

(75) Inventors: Emerando M. Delos Reyes, Pleasant Hill, CA (US); Imtiyaz Shaikh, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 306 days.

(21) Appl. No.: 12/898,174

(22) Filed: Oct. 5, 2010

(65) Prior Publication Data
US 2012/0084449 A1    Apr. 5, 2012

(51) Int. Cl.
*G06F 15/16* (2006.01)
(52) U.S. Cl.
USPC .......................... 709/229; 709/230; 709/245
(58) Field of Classification Search
None
See application file for complete search history.

(56) References Cited

U.S. PATENT DOCUMENTS

| | | | |
|---|---|---|---|
| 2009/0270098 A1* | 10/2009 | Gallagher et al. | 455/435.1 |
| 2011/0075675 A1* | 3/2011 | Koodli et al. | 370/401 |
| 2011/0096750 A1* | 4/2011 | Velandy et al. | 370/331 |
| 2011/0103310 A1* | 5/2011 | Stojanovski et al. | 370/328 |
| 2011/0171953 A1* | 7/2011 | Faccin et al. | 455/426.1 |
| 2012/0215931 A1* | 8/2012 | Touati et al. | 709/229 |

* cited by examiner

*Primary Examiner* — Dhairya A Patel

(57) ABSTRACT

A device receives a PDN connection request from a UE, and exchanges, with a HSS, authentication and authorization information associated with the UE. The device also constructs an APN FQDN based on the authentication and authorization information, and sends a query, that includes the APN FQDN, to a DNS server. The device further receives, from the DNS server, PGW FQDNs that contain the APN FQDN, and compares the PGW FQDNs with a FQDN associated with a SGW. The device determines, based on the comparison, a PGW, associated with a PGW FQDN that is a closest match to the FQDN associated with the SGW, to be a primary PGW for the PDN connection request. The device also determines, based on the comparison, one or more PGWs, residing within a predetermined distance of the SGW, to be one or more backup PGWs for the PDN connection request.

17 Claims, 8 Drawing Sheets

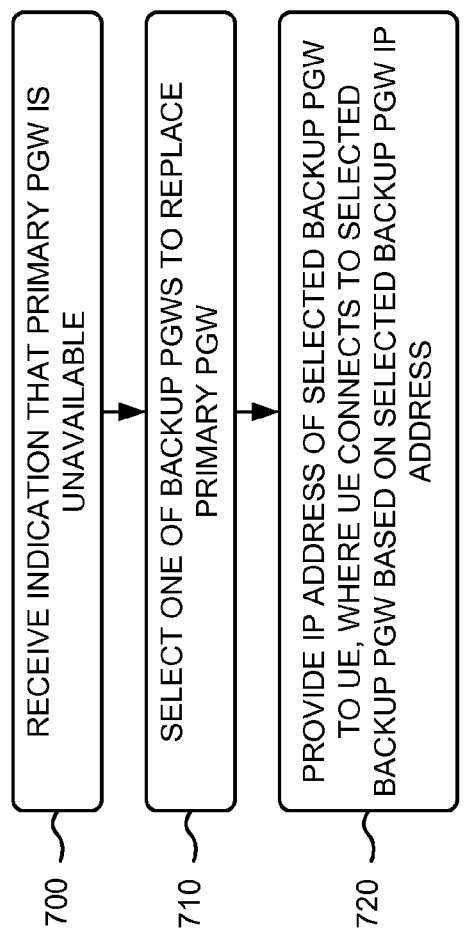

DYNAMIC SELECTION OF PACKET DATA NETWORK GATEWAYS

BACKGROUND

Fourth generation (4G) cellular networks include a radio access network (e.g., a long term evolution (LTE) network or an enhanced high rate packet data (eHRPD) network) and a wireless core network (e.g., referred to as an evolved packet core (EPC) network). The LTE network is often called an evolved universal terrestrial radio access network (E-UTRAN). The EPC network is an all-Internet protocol (IP) packet-switched core network that supports high-speed wireless and wireline broadband access technologies. An evolved packet system (EPS) is defined to include both the LTE (or eHRPD) and EPC networks. EPS improves mobile technology by providing higher bandwidth, better spectrum efficiency, wider coverage, enhanced security, and full interworking with other access networks. EPS proposes provides these improvements using an all-IP architecture.

A packet data network (PDN) gateway (PGW) is one network element provided in the EPC network. When user equipment (UE) connects or attaches to the EPC network, the UE is attached or anchored at the PGW in order to provide the UE with access to one or more PDNs. The PGW is the common anchor point for UEs in LTE or eHRPD service areas.

During UE attachment to a PGW or a particular PDN, the EPC network separates the signaling plane and the user plane as the UE communicates with the EPC network. In the EPC network, the signaling plane for LTE access is handled by a mobility management entity (MME), and the user plane for LTE access is handled by a serving gateway (SGW). A UE first communicates with a MME during a UE authentication and authorization process. During this process, the MME selects a PGW for the UE (e.g., when the UE attempts to connect to a particular PDN). The selection of a PGW for a particular PDN may be a static process or a dynamic process. When the UE signals a MME for a PDN connection, the MME interacts with a home subscriber server (HSS) in order to authenticate and/or authorize the UE. The HSS provides the MME with UE (or subscriber) profile data that includes a static or dynamic field (e.g., a PGW allocation type field). When the field is static, the HSS provides the MME with a fully qualified domain name (FQDN) of the PGW to be used by the UE to access the PDN. However, when the field is dynamic, the MME forms the FQDN by selecting a geographically closest PGW to the UE.

The signaling plane of an eHRPD network is handled by a HRPD serving gateway (HSGW). Like the MME, the HSGW aids the UE by forming a conduit for UE authentication and/or authorization with an authentication, authorization, and accounting (AAA) device (e.g., which accesses the same subscriber database as the HSS). The HSGW also utilizes the same PGW allocation type field, which is set as static or dynamic for PGW selection. For the static case, the AAA device returns the PGW FQDN, and for the dynamic case, the HSGW forms the PGW FQDN by selecting a geographically closest PGW to the UE.

A UE sets up each PDN connection via MME selection of a PGW for each PDN connection request. The PGW selected for different PDN connection requests may be the same physical PGW or it may be different PGWs. When the MME selects a PGW for a PDN connection request, the MME sends a query to a domain name system (DNS) server for IP address resolution of the selected PGW's FQDN. The DNS server contains IP address mappings to PGW FQDNs. The DNS server provides a response (e.g., to the MME query) that includes a single IP address (e.g., of the selected PGW) corresponding to the selected PGW's FQDN. However, the MME cannot determine the availability of the selected PGW since no direct signaling exists between the MME and PGWs. If the selected PGW is unavailable (e.g., because a user plane link between the SGW and PGW is down, because the PGW is out of capacity and cannot serve any more PDN sessions, etc.), the PDN connection request will fail and the UE will have to establish a PDN connection all over again.

To maintain service availability, two or more PGWs may be configured in an active/standby pair. This may be accomplished by enabling Inter-Chassis Session Recovery (ICSR) (e.g., between the PGWs) that supports either local redundancy (e.g., co-located PGWs) or geographical redundancy (e.g., PGWs with different locations). The PGWs that participate in one logical ICSR group share a single virtual IP (VIP) address. For example, an active PGW located in San Francisco and a standby PGW located in Los Angeles may be configured as an ICSR group. The two PGWs may be assigned a single VIP address (e.g., "0.0.0.1"). If the active PGW in San Francisco fails, the standby PGW in Los Angeles may automatically become active. Since both PGWs share the same VIP address (e.g., "0.0.0.1"), none of the underlying network elements would notice the active PGW's failure.

However, in such an arrangement, the MME only supports a single VIP address for PGW selection. Furthermore, even though ICSR provides inter-chassis redundancy across more than one PGW, certain catastrophic failures which can cause total network outages (e.g., IP routing failures, line cuts, loss of power, physical destruction of the chassis participating in the ICSR, etc.) cannot be protected against by this arrangement. In such cases, the single VIP address stored by the MME will become unreachable. This may result in a total or a major network outage.

BRIEF DESCRIPTION OF THE DRAWINGS

FIGS. 5A-7 are flow charts of an example process for providing dynamic selection of PGWs according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide PGW diversity for LTE (or eHRPD) networks during dynamic selection of PGWs for PDN connection requests. The systems and/or methods may enable a MME (or a HSGW) to select more than one PGW IP address during UE attachment. The systems and/or methods may prevent PGW attachment failure by providing additional redundancy and diversity during the PGW selection procedure. In one example, the systems and/or methods described herein may be applied to any network (e.g., eHRPD access networks, LTE access networks, etc.) that services PDN connection requests. However, the systems and/or methods may be described primarily herein in connection with a LTE and EPC network architecture.

In one example implementation, the systems and/or methods may receive a PDN connection request from a UE, and may exchange, with a HSS, authentication and/or authorization information associated with the UE. The systems and/or methods may construct an access point name (APN) FQDN based on the authentication/authorization information, and may send, a name authority pointer (NAPTR) query (e.g., that includes the APN FQDN) to a DNS server. The systems and/or methods may receive, from the DNS server, FQDNs of PGWs that contain the APN FQDN, and may compare the FQDNs of the PGWs with a SGW FQDN. The systems and/or methods may determine a PGW FQDN with a closest match to the SGW FQDN to be a primary PGW, and may determine PGW(s) residing within a same area as a SGW to be backup PGW(s). The systems and/or methods may send, to the DNS server, queries based on the primary and backup PGW FQDNs, may receive, based on the queries and from the DNS server, IP addresses matching the primary/backup PGW FQDNs, and may store the IP addresses in memory. If the primary PGW is available, the systems and/or methods may provide the primary PGW IP address to the UE so that the UE can connect to the primary PGW. If the primary PGW is unavailable, the systems and/or methods may provide a backup PGW IP address to the UE so that the UE can connect to the backup PGW.

As used herein, the terms "subscriber" and/or "user" may be used interchangeably. Also, the terms "subscriber" and/or "user" are intended to be broadly interpreted to include a UE or a user of a UE.

Figure 1:
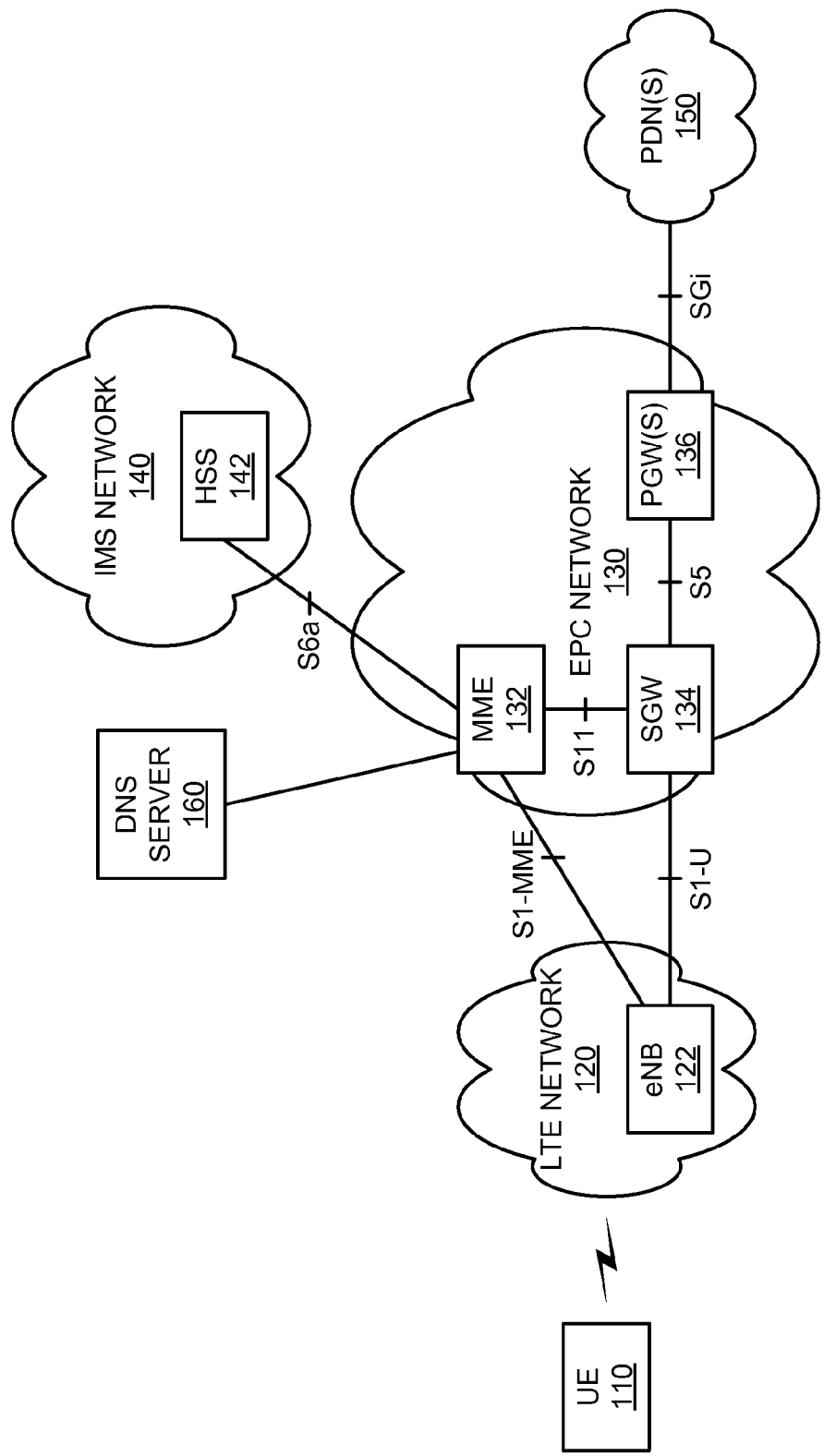
FIG. 1 is a diagram of an example network in which systems and/or methods described herein may be implemented.

FIG. 1 is a diagram of an example network 100 in which systems and/or methods described herein may be implemented. As illustrated, network 100 may include a UE 110, a LTE network 120, an EPC network 130, an IP multimedia subsystem (IMS) network 140, multiple PDN(s) 150, and a DNS server 160. LTE network 120 may include an eNodeB (eNB) 122. EPC network 130 may include a mobility management entity (MME) 132, a serving gateway (SGW) 134, and multiple PDN gateways (PGW(s)) 136. IMS network 140 may include a home subscriber server (HSS) 142. Devices and/or networks of network 100 may interconnect via wired and/or wireless connections.

A single UE 110, LTE network 120, eNB 122, EPC network 130, MME 132, SGW 134, IMS network 140, HSS 142, and DNS server 160, and multiple PGWs 136 and PDNs 150 have been illustrated in FIG. 1 for simplicity. In practice, there may be more UEs 110, LTE networks 120, eNBs 122, EPC networks 130, MMEs 132, SGWs 134, PGWs 136, IMS networks 140, HSSs 142, PDNs 150, and/or DNS servers 160. As further shown in FIG. 1, eNB 122 may interface with MME 132 over a S1-MME interface, and may interface with SGW 134 over a S1-U interface. MME 132 may interface with SGW 134 over a S11 interface, may interface with HSS 142 over a S6a interface, and may interface with DNS server 160. SGW 134 may interface with PGW(s) 136 over S5 interfaces. PGW(s) 136 may interface with PDN(s) 150 over SGi interfaces.

UE 110 may include a radiotelephone, a personal communications system (PCS) terminal (e.g., that may combine a cellular radiotelephone with data processing and data communications capabilities), a wireless telephone, a cellular telephone, a smart phone, a personal digital assistant (PDA) (e.g., that can include a radiotelephone, a pager, Internet/intranet access, etc.), a laptop computer (e.g., with a wireless air card), or other types of computation or communication devices. In an example implementation, UE 110 may include a device that is capable of communicating over LTE network 120, EPC network 130, IMS network 140, and/or PDN(s) 150.

LTE network 120 may include a communications network that connects subscribers (e.g., UE 110) to a service provider. In one example, LTE network 120 may include a WiFi network (e.g., using IEEE 802.11 standards) or other access networks (e.g., an E-UTRAN or an enhanced high-rate packet data (eHRPD) network). In another example, LTE network 120 may include a radio access network capable of supporting high data rate, low latency, packet optimization, large capacity and coverage, etc.

eNB 122 may include one or more computation and/or communication devices that receive voice and/or data from MME 132 and/or SGW 134 and wirelessly transmit that voice and/or data to UE 110. eNB 122 may also include one or more devices that wirelessly receive voice and/or data from UE 110 and transmit that voice and/or data to one of MME 132 and/or SGW 134 or to other UEs 110. eNB 122 may combine the functionalities of a base station and a radio network controller (RNC) in 2G or 3G radio access networks.

EPC network 130 may include a core network architecture of the Third Generation Partnership Project (3GPP) LTE wireless communication standard. In one example, EPC network 130 may include an all-IP packet-switched core network that supports high-speed wireless and wireline broadband access technologies. In another example, EPC network 130 may provide packet-switched voice services (e.g., which are traditionally circuit-switched) using IMS network 140.

MME 132 may include one or more computation and/or communication devices that may be responsible for idle mode tracking and paging procedures (e.g., including retransmissions) for UE 110. MME 132 may be involved in a bearer activation/deactivation process (e.g., for UE 110) and may choose a SGW for UE 110 at an initial attach and at a time of intra-LTE handover. MME 132 may authenticate UE 110 (e.g., via interaction with HSS 142). Non-access stratum (NAS) signaling may terminate at MME 132 and MME 132 may generate and allocate temporary identities to UEs (e.g., UE 110). MME 132 may check authorization of UE 110 to camp on a service provider's Public Land Mobile Network (PLMN) and may enforce roaming restrictions for UE 110. MME 132 may be a termination point in EPC network 130 for ciphering/integrity protection for NAS signaling and may handle security key management. MME 132 may provide a control plane function for mobility between LTE and access networks.

In one example implementation, MME 132 may receive a PDN connection request from UE 110, and may exchange, with HSS 142, authentication and/or authorization information associated with UE 110. MME 132 may construct an APN FQDN based on the authentication/authorization information, and may send, a NAPTR query (e.g., that includes the APN FQDN) to DNS server 160. MME 132 may receive, from DNS server 160, FQDNs of PGWs 136 that contain the APN FQDN, and may compare the FQDNs of PGWs 136 with a FQDN of SGW 134. MME 132 may determine a PGW FQDN with a closest match to the SGW FQDN to be a primary PGW 136, and may determine PGW(s) 136 residing within a same area as SGW 134 to be backup PGW(s) 136. MME 132 may send, to DNS server 160, queries based on the primary and backup PGW FQDNs, may receive, based on the queries and from DNS server 160, IP addresses matching the primary/backup PGW FQDNs, and may store the IP addresses in memory. If the primary PGW 136 is available, MME 132 may provide the primary PGW IP address to UE 110 so that UE 110 can connect to the primary PGW 136. If the primary PGW 136 is unavailable, MME 132 may provide a backup PGW IP address to UE 110 so that UE 110 can connect to the backup PGW 136. Further details of MME 132 are provided below in connection with, for example, one or more of FIGS. 3-7.

SGW 134 may include one or more data transfer devices (or network devices), such as a gateway, a router, a switch, a firewall, a network interface card (NIC), a hub, a bridge, a proxy server, an optical add-drop multiplexer (OADM), or some other type of device that processes and/or transfers data. In one example implementation, SGW 134 may route and forward user data packets, may act as a mobility anchor for a user plane during inter-eNB handovers, and may act as an anchor for mobility between LTE and other 3GPP technologies. For idle state UEs 110, SGW 134 may terminate a downlink (DL) data path and may trigger paging when DL data arrives for UE 110. SGW 134 may manage and store contexts associated with UE 110 (e.g., parameters of an IP bearer service, network internal routing information, etc.).

Each of PGWs 136 (hereinafter referred to as "PGW 136") may include one or more data transfer devices (or network devices), such as a gateway, a router, a switch, a firewall, a NIC, a hub, a bridge, a proxy server, an OADM, or some other type of device that processes and/or transfers data. In one example implementation, PGW 136 may provide connectivity of UE 110 to external PDNs (e.g., to PDNs 150) by being a traffic exit/entry point for UE 110. UE 110 may simultaneously connect to more than one PGW 136 for accessing multiple PDNs 150. PGW 136 may perform policy enforcement, packet filtering for each user, charging support, lawful intercept, and packet screening. PGW 136 may also act as an anchor for mobility between 3GPP and non-3GPP technologies.

IMS network 140 may include an architectural framework or network (e.g., a telecommunications network) for delivering IP multimedia services.

HSS 142 may include one or more computation or communication devices that gather, process, search, and/or provide information in a manner described herein. In one example implementation, HSS 142 may include a master user database that supports devices of IMS network 140 that handle calls. HSS 142 may include subscription-related information (e.g., subscriber profiles), may perform authentication and authorization of a user, and may provide information about a subscriber's location and IP information.

Each of PDNs 150 (hereinafter referred to as "PDN 150") may include one or more networks (e.g., a local area network (LAN), a wide area network (WAN), a metropolitan area network (MAN), a telephone network, the Internet, etc.) capable of communicating with UE 110. In one example PDN 150 may include a network that breaks up a message (e.g., information) into packets for transmission. Unlike a circuit switching network, which requires establishment of a dedicated point-to-point connection, each packet in PDN 150 may include a destination address. Thus, all packets in a single message may not travel the same path. As traffic conditions change in PDN 150, the packets may be dynamically routed via different paths in PDN 150, and the packets may even arrive out of order. A destination device in PDN 150 may reassemble the packets into their proper sequence.

DNS server 160 may include one or more server devices, or other types of computation or communication devices, that gather, process, and/or provide information in a manner described herein. For example, DNS server 160 may include a device that is registered with the DNS. The DNS may include a distributed hierarchical naming system for devices, services, or any resources connected to the Internet or other networks. The DNS may associate a variety of information with domain names assigned to each of the devices, services, resources, etc. The DNS may translate domain names into numerical (e.g., binary) identifiers associated with network devices for the purpose of locating and addressing these network devices. DNS server 160 may execute special-purpose networking software, may include a public IP address, and may provide a database of network names and IP addresses for network devices (e.g., PGW(s) 136).

Although FIG. 1 shows example devices/networks of network 100, in other implementations, network 100 may include fewer devices/networks, different devices/networks, differently arranged devices/networks, or additional devices/networks than depicted in FIG. 1. Alternatively, or additionally, one or more devices/networks of network 100 may perform one or more other tasks described as being performed by one or more other devices/networks of network 100.

Figure 2:
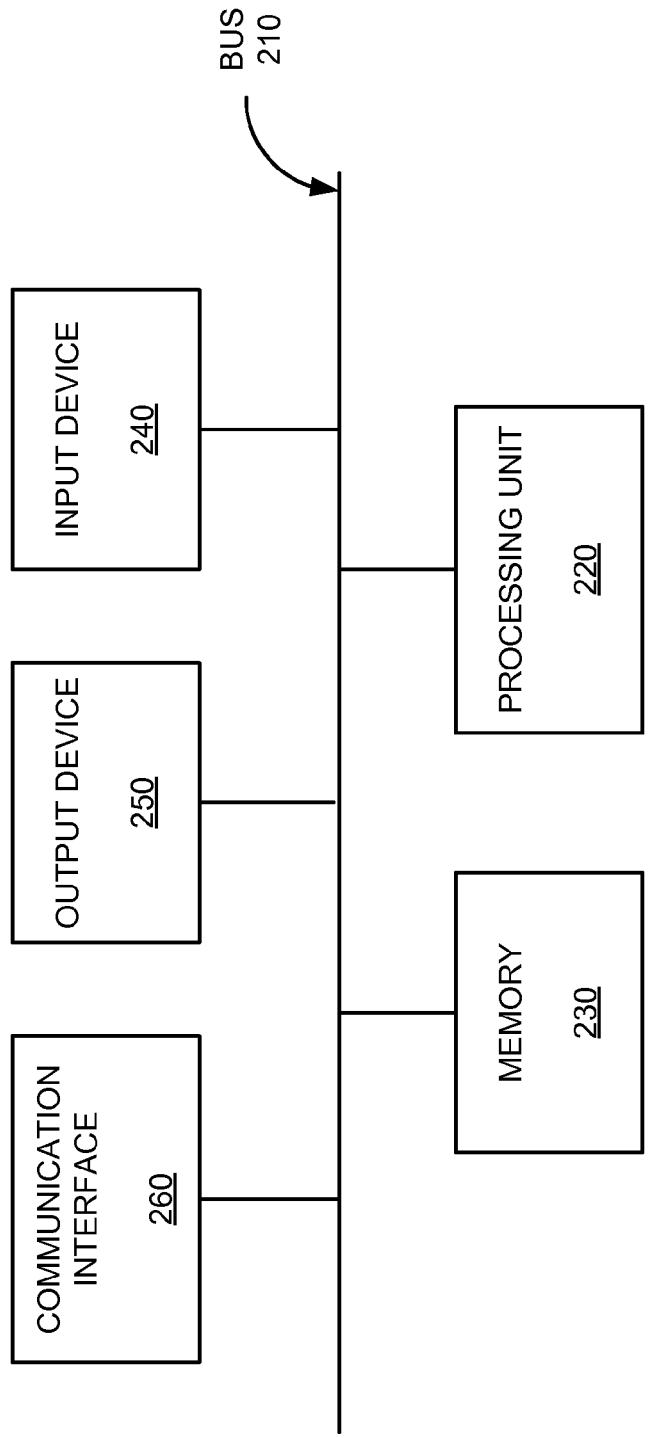
FIG. 2 is a diagram of example components of a device that may correspond to one of the devices of the network depicted in FIG. 1.

FIG. 2 is a diagram of example components of a device 200 that may correspond to one of the devices of network 100. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 360 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a physical or logical memory device. A logical memory device may include memory space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
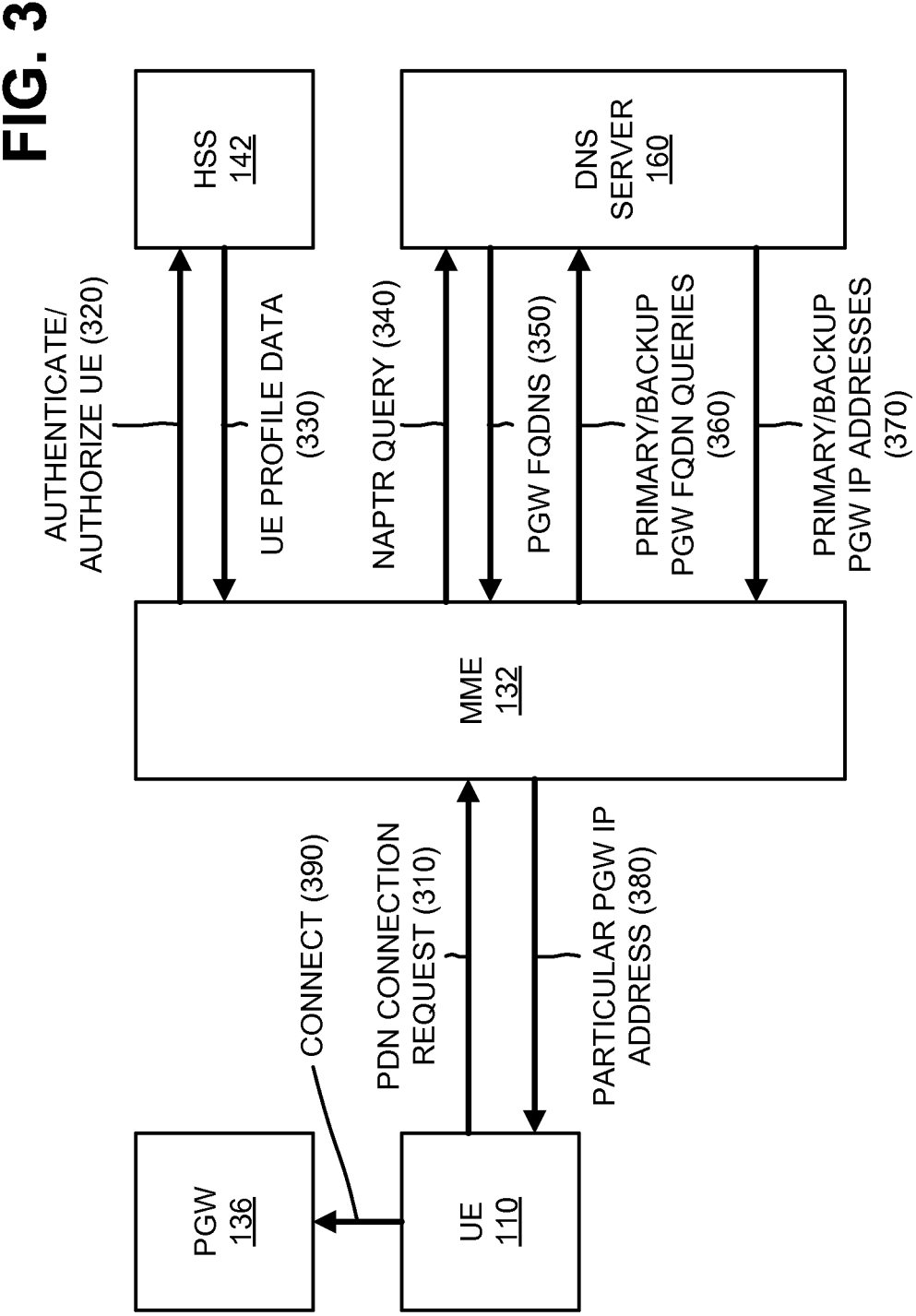
FIG. 3 is a diagram of example interactions among components of an example portion of the network depicted in FIG. 1.

FIG. 3 is a diagram of example interactions among components of an example portion 300 of network 100. As shown, example network portion 300 may include UE 110, MME 132, PGW 136, HSS 142, and DNS server 160. UE 110, MME 132, PGW 136, HSS 142, and DNS server 160 may include the features described above in connection with one or more of FIGS. 1 and 2.

As further shown in FIG. 3, during initial attachment, UE 110 may provide a PDN connection request 310 to MME 132. PDN connection request 310 may include a request for connecting UE 110 to a particular PDN 150 (e.g., via one of PGWs 136). Based on PDN connection request 310, MME 132 may exchange authentication and/or authorization information with HSS 142 in order to authenticate and/or authorize UE 110, as indicated by reference number 320. During the exchange of authentication and/or authorization information, HSS 142 may provide, to MME 132, profile data 330 associated with UE 110. In one example, profile data 330 may include a PDN list that specifies PDNs 150 to which UE 110 may automatically connect. MME 132 may construct an APN FQDN based on the authentication/authorization information and/or profile data 330. The APN FQDN may include a FQDN that identifies a specific PGW 136 in a core network (e.g., EPC network 130). A FQDN may include a human-readable name corresponding to a network interface, as found on a network device (e.g., PGW 136).

When the APN FQDN is constructed, MME 132 may generate a NAPTR query 340, and may provide NAPTR query 340 to DNS server 160. NAPTR query 340 may be a query that includes one or more resource records used in DNS server 160. In one example, NAPTR query 340 may include an entry for the constructed APN FQDN, and may be used to determine possible PGW 136 matches for UE 110 (e.g., for PDN connection request 310). DNS server 160 may respond to NAPTR query 340 with FQDNs 350 of all PGWs 136 that include the APN FQDN. As further shown in FIG. 3, DNS server 160 may provide PGW FQDNs 350 to MME 132.

To determine primary and backup PGWs 136, MME 132 may compare PGW FQDNs 350 (e.g., received from DNS server 160) with a FQDN associated with a SGW (e.g., SGW 134).

In one example implementation, the SGW FQDN may be stored in a memory (e.g., memory 230) associated with MME 132. In another example implementation, MME 132 may perform a SGW selection procedure that retrieves the SGW FQDN and stores the SGW FQDN in a memory of MME 132. MME 132 may determine the PGW FQDN 350 with a closest match to the SGW FQDN to be the primary PGW 136. MME 132 may determine any remaining PGW(s) 136 that reside within a same area as SGW 134 (e.g., within a predetermined distance) to be the backup PGW(s) 136. The PGW matching and selection processes (e.g., performed by MME 132) may be determined based on PGW FQDNs 350. Each of PGW FQDNs 350 may provide a physical location (e.g., an area, a sub-area, a mobile telephone switching office (MTSO) location, etc.) of a particular PGW 136.

MME 132 may utilize FQDNs associated with the primary PGW 136 and the backup PGW(s) 136 to generate primary/backup PGW FQDN queries 360 that request IP addresses for the primary PGW 136 and the backup PGW(s) 136. As further shown in FIG. 3, MME 132 may provide primary/backup PGW FQDN queries 360 to DNS server 160. DNS server 160 may respond to queries 360 with IP addresses 370 that match the FQDNs associated with the primary PGW 136 and the backup PGW(s) 136. As further shown in FIG. 3, DNS server 160 may provide IP addresses 370 to MME 132. MME 132 may cache (e.g., in memory 230) IP addresses 370 for UE 110 (e.g., for every PDN 150 that UE 110 is allowed to access).

As further shown in FIG. 3, MME 132 may provide a particular PGW IP address 380 to UE 110, and UE 110 may connect to the particular PGW 136 based on particular PGW IP address 380, as indicated by reference number 390. PGW 136, in turn, may provide UE 110 with access to a PDN 150 requested by PDN connection request 310.

In one example implementation, if the primary PGW 136 is available, particular PGW IP address 380 may include an IP address of the primary PGW 136. MME 132 may provide the IP address of the primary PGW 136 to UE 110, and UE 110 may connect to the primary PGW 136 based on the IP address of the primary PGW 136. The primary PGW 136, in turn, may provide UE 110 with access to the PDN 150 requested by PDN connection request 310.

In another example implementation, if the primary PGW 136 is unavailable (e.g., based on an indication received by MME 132), particular PGW IP address 380 may include an IP address of one of the backup PGWs 136. MME 132 may select one of the backup PGWs 136 to replace the primary PGW 136, and may provide the IP address of the selected backup PGW 136 to UE 110. UE 110 may connect to the selected backup PGW 136 based on the IP address of the selected backup PGW 136. The selected backup PGW 136, in turn, may provide UE 110 with access to the PDN 150 requested by PDN connection request 310. Such an arrangement may ensure that PDN connection request 310 does not fail and that UE 110 connects to the PDN 150 requested by PDN connection request 310. This may optimize the PDN connection requests that UE 110 makes each time.

Although FIG. 3 shows example components of network portion 300, in other implementations, network portion 300 may include fewer components, different components, differently arranged components, or additional components than depicted in FIG. 3. Additionally, or alternatively, one or more components of network portion 300 may perform one or more other tasks described as being performed by one or more other components of network portion 300.

Figure 4:
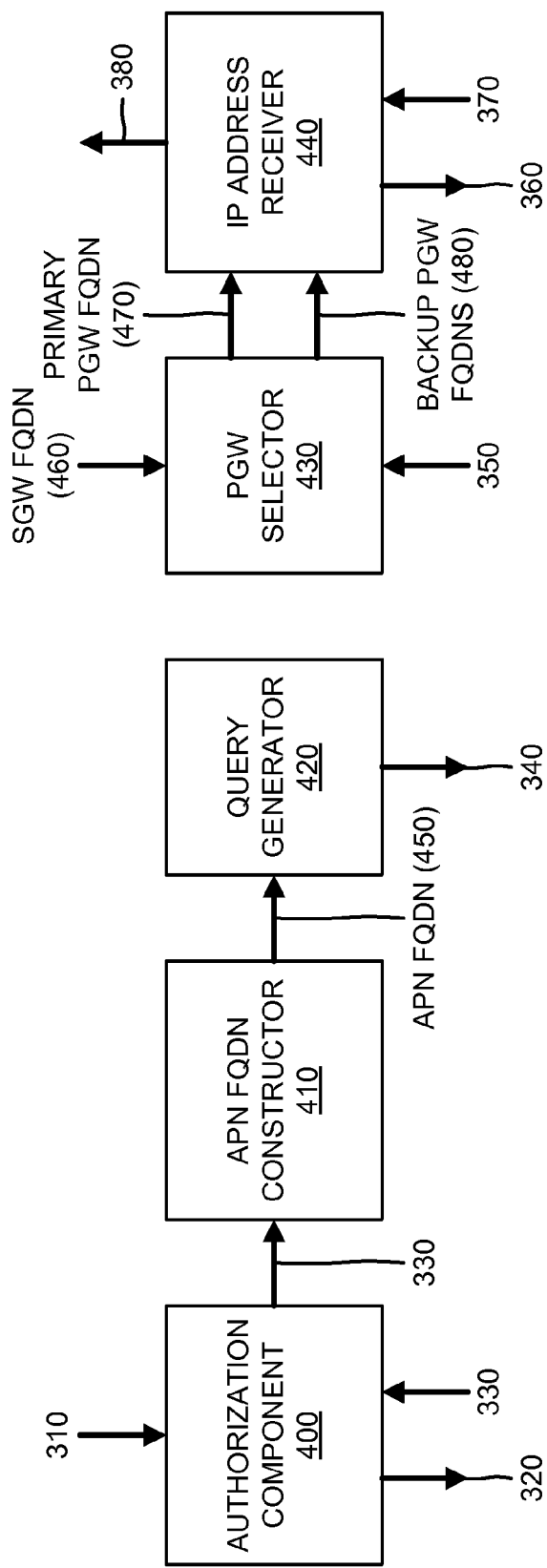
FIG. 4 is a diagram of example functional components of a MME of the network depicted in FIG. 1.

FIG. 4 is a diagram of example functional components of MME 132. In one example, the functional components described in connection with FIG. 4 may be implemented by one or more of the components depicted in FIG. 2. As shown, MME 132 may include an authorization component 400, an APN FQDN constructor 410, a query generator 420, a PGW selector 430, and an IP address receiver 440.

Authorization component 400 may include hardware or a combination of hardware and software that may receive PDN connection request 310 from UE 110, and may exchange authentication/authorization information with HSS 142 in order to authenticate and/or authorize UE 110, as indicated by reference number 320. Authorization component 400 may also receive, from HSS 142, profile data 330 associated with UE 110, and may provide the authentication/authorization information and/or profile data 330 to APN FQDN constructor 410.

APN FQDN constructor 410 may include hardware or a combination of hardware and software that may receive authentication/authorization information and/or profile data 330 from authorization component 400, and may construct an APN FQDN 450 based on the authentication/authorization information and/or profile data 330. APN FQDN 450 may include a FQDN (e.g., a human-readable name) that identifies a specific PGW 136 in a core network (e.g., EPC network 130). As further shown in FIG. 4, APN FQDN constructor 410 may provide APN FQDN 450 to query generator 420.

Query generator 420 may include hardware or a combination of hardware and software that may receive APN FQDN 450 from APN FQDN constructor 410, and may generate NAPTR query 340 based on APN FQDN 450. In one example, NAPTR query 340 may include an entry for constructed APN FQDN 450, and may be used to determine possible PGW 136 matches for UE 110 (e.g., for PDN connection request 310). Query generator 420 may provide NAPTR query 340 to DNS server 160.

PGW selector 430 may include hardware or a combination of hardware and software that may receive, from DNS server 160, FQDNs 350 of all PGWs 136 that include APN FQDN 450, and may receive a SGW FQDN 460 from a memory (e.g., memory 230) of MME 132. SGW FQDN 460 may include a FQDN associated with a SGW (e.g., SGW 134). PGW selector 430 may determine a PGW FQDN 350 with a closest match to SGW FQDN 460 to be a primary PGW FQDN 470. PGW selector 430 may determine any remaining PGW(s) 136 that reside within a same area as SGW 134 to be backup PGW FQDNs 480. As further shown in FIG. 4, PGW selector 430 may provide primary PGW FQDN 470 and backup PGW FQDNs 480 to IP address receiver 440.

IP address receiver 440 may include hardware or a combination of hardware and software that may receive primary PGW FQDN 470 and backup PGW FQDNs 480 from PGW selector 430. IP address receiver 440 may utilize primary PGW FQDN 470 and backup PGW FQDNs 480 to generate primary/backup PGW FQDN queries 360 that request IP addresses for the primary PGW 136 and the backup PGW(s) 136. IP address receiver 440 may provide primary/backup PGW FQDN queries 360 to DNS server 160, and may receive, from DNS server 160, IP addresses 370 matching primary PGW FQDN 470 and backup PGW FQDNs 480. IP address receiver 440 may provide particular PGW IP address 380 to UE 110, and UE 110 may connect to the particular PGW 136 based on particular PGW IP address 380.

Although FIG. 4 shows example functional components of MME 132, in other implementations, MME 132 may include fewer functional components, different functional components, differently arranged functional components, or additional functional components than depicted in FIG. 4. Additionally, or alternatively, one or more functional components of MME 132 may perform one or more other tasks described as being performed by one or more other functional components of MME 132.

FIGS. 5A-7 are flow charts of an example process 500 for providing dynamic selection of PGWs according to implementations described herein. In one implementation, process 500 may be performed by MME 132. In another implementation, some or all of process 500 may be performed by another device or group of devices, including or excluding MME 132.

Figure 5A:
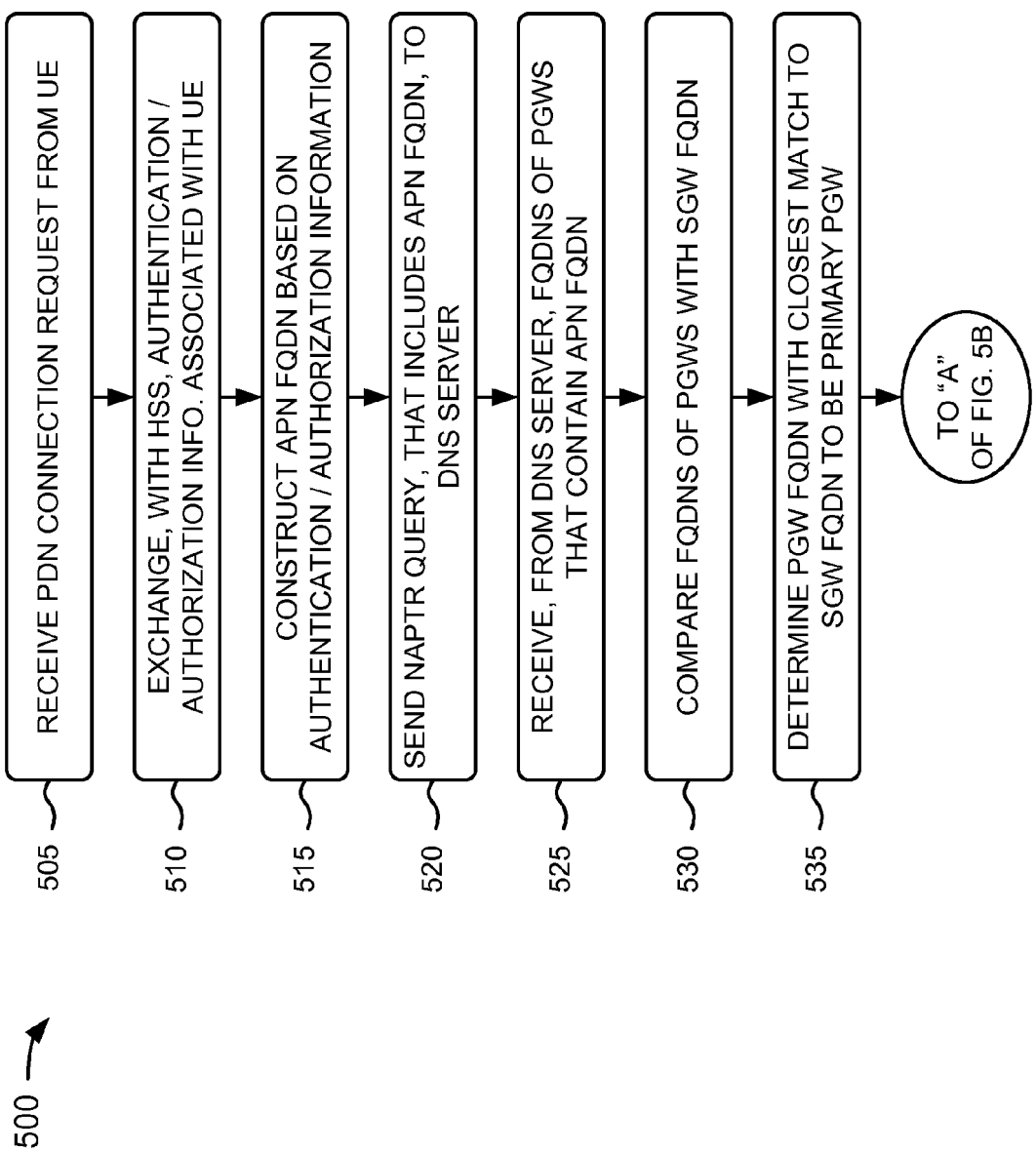

As shown in FIG. 5A, process 500 may include receiving a PDN connection request from a UE (block 505), and exchanging, with a HSS, authentication and/or authorization information associated with the UE (block 510). For example, in implementations described above in connection with FIG. 3, during initial attachment, UE 110 may provide PDN connection request 310 to MME 132. PDN connection request 310 may include a request for connecting UE 110 to a particular PDN 150 (e.g., via one of PGWs 136). Based on PDN connection request 310, MME 132 may exchange authentication and/or authorization information with HSS 142 in order to authenticate and/or authorize UE 110, as indicated by reference number 320. During the exchange of authentication and/or authorization information, HSS 142 may provide, to MME 132, profile data 330 associated with UE 110. In one example, profile data 330 may include a PDN list that specifies PDNs 150 to which UE 110 automatically connects.

As further shown in FIG. 5A, process 500 may include constructing an APN FQDN based on the authentication/authorization information (block 515), sending a NAPTR query, that includes the APN FQDN, to a DNS server (block 520), and receiving, from the DNS server, FQDNs of PGWs that contain the APN FQDN (block 525). For example, in implementations described above in connection with FIG. 3, MME 132 may construct an APN FQDN based on the authentication/authorization information and/or profile data 330. The APN FQDN may include a FQDN that identifies a specific PGW 136 in a core network (e.g., EPC network 130). MME 132 may generate NAPTR query 340, and may provide NAPTR query 340 to DNS server 160. NAPTR query 340 may include an entry for the constructed APN FQDN, and may be used to determine possible PGW 136 matches for UE 110 (e.g., for PDN connection request 310). DNS server 160 may respond to NAPTR query 340 with FQDNs 350 of all PGWs 136 that include the APN FQDN.

Figure 5B:
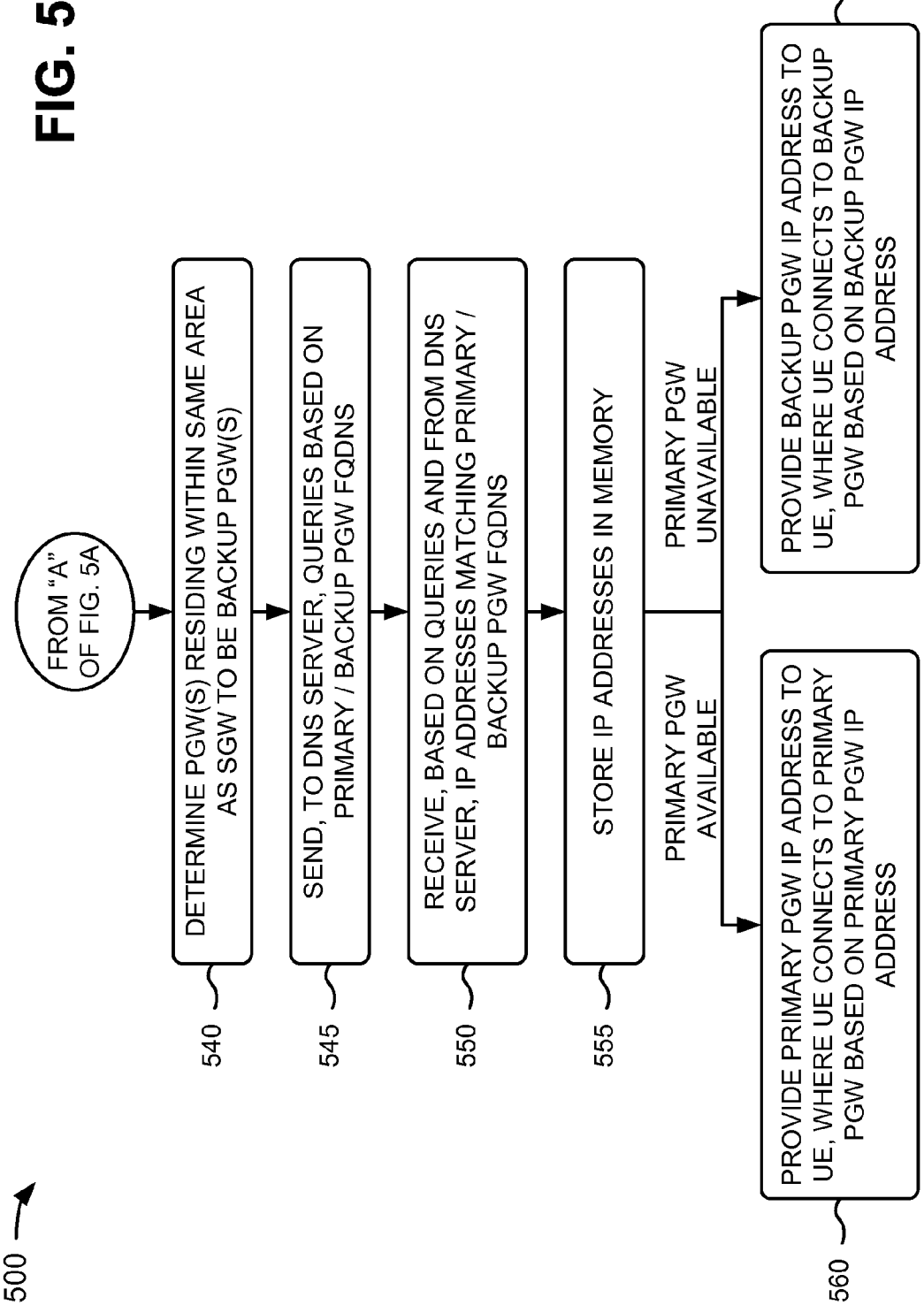

As shown in FIGS. 5A and 5B, process 500 may include comparing the FQDNs of the PGWs with a SGW FQDN (block 530), determining a PGW FQDN with a closest match to the SGW FQDN to be a primary PGW (block 535), and determining PGW(s) residing within a same area as the SGW to be backup PGW(s) (block 540). For example, in implementations described above in connection with FIG. 3, to determine primary and backup PGWs 136, MME 132 may compare PGW FQDNs 350 (e.g., received from DNS server 160) with a FQDN associated with a SGW (e.g., SGW 134). MME 132 may determine a PGW FQDN 350 with a closest match to the SGW FQDN to be the primary PGW 136. MME 132 may determine any remaining PGW(s) 136 that reside within a same area as SGW 134 (e.g., within a predetermined distance) to be the backup PGW(s) 136. The PGW matching and selection processes (e.g., performed by MME 132) may be determined based on PGW FQDNs 350. Each of PGW FQDNs 350 may provide a physical location (e.g., an area, a sub-area, a MTSO location, etc.) of a particular PGW 136.

As shown in FIG. 5B, process 500 may include, sending, to the DNS server, queries based on the primary/backup PGW FQDNs (block 545), receiving, based on the queries and from the DNS server, IP addresses matching the primary/backup PGW FQDNs (block 550), and storing the IP addresses in memory (block 555). For example, in implementations described above in connection with FIG. 3, MME 132 may utilize FQDNs associated with the primary PGW 136 and the backup PGW(s) 136 to generate primary/backup PGW FQDN queries 360 that request IP addresses for the primary PGW 136 and the backup PGW(s) 136. MME 132 may provide primary/backup PGW FQDN queries 360 to DNS server 160. DNS server 160 may respond to queries 360 with IP addresses 370 that match the FQDNs associated with the primary PGW 136 and the backup PGW(s) 136. MME 132 may cache (e.g., in memory 230) IP addresses 370 for UE 110 (e.g., for every PDN 150 that UE 110 is allowed to access).

As further shown in FIG. 5B, if the primary PGW is available (block 555—PRIMARY PGW AVAILABLE), process 500 may include providing the primary PGW IP address to the UE, where the UE connects to the primary PGW based on the primary PGW IP address (block 560). For example, in implementations described above in connection with FIG. 3, if the primary PGW 136 is available, particular PGW IP address 380 may include an IP address of the primary PGW 136. MME 132 may provide the IP address of the primary PGW 136 to UE 110, and UE 110 may connect to the primary PGW 136 based on the IP address of the primary PGW 136.

Retuning to FIG. 5B, if the primary PGW is not available (block 555—PRIMARY PGW UNAVAILABLE), process 500 may include providing a backup PGW IP address to the UE, where the UE connects to the backup PGW based on the backup PGW IP address (block 565). For example, in implementations described above in connection with FIG. 3, if the primary PGW 136 is unavailable, particular PGW IP address 380 may include an IP address of one of the backup PGWs 136. MME 132 may provide the IP address of the backup PGW 136 to UE 110. UE 110 may connect to the backup PGW 136 based on the IP address of the backup PGW 136.

Figure 6:
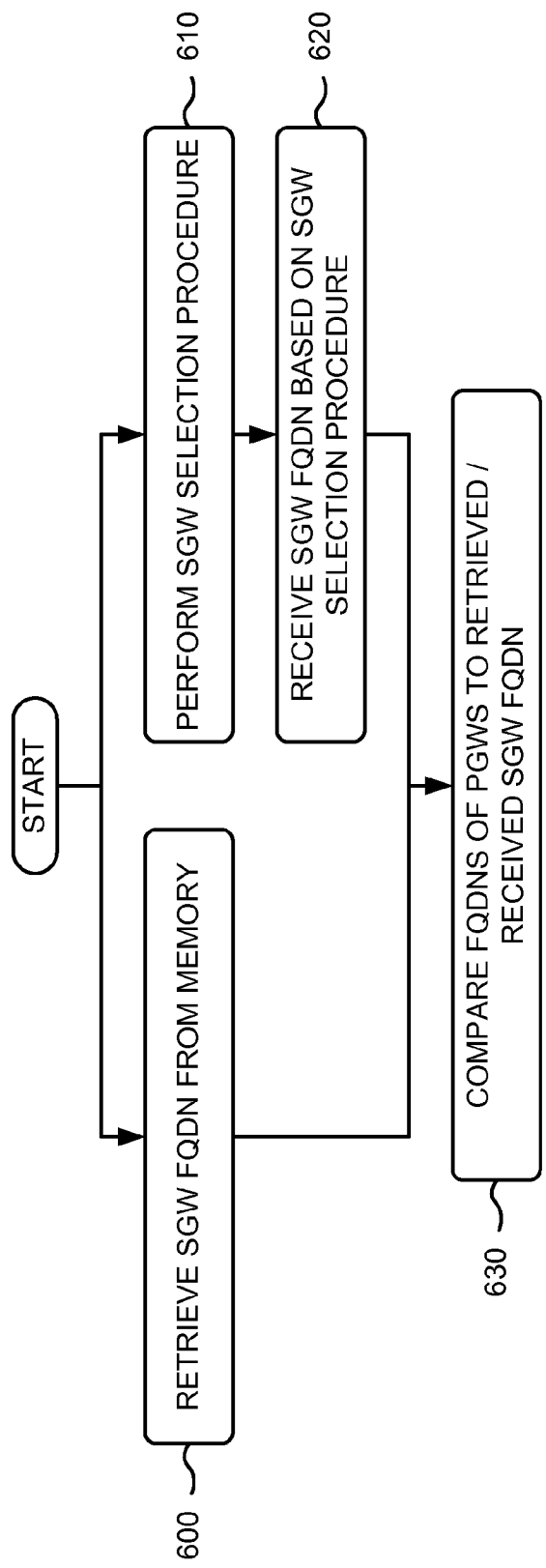

Process block 530 may include the process blocks depicted in FIG. 6. As shown in FIG. 6, process block 530 may include retrieving the SGW FQDN from memory (block 600). Alternatively, process block 530 may include performing a SGW selection procedure (block 610) and receiving the SGW FQDN based on the SGW selection procedure (block 620). Process block 530 may also include comparing the FQDNs of the PGWs to the retrieved or received SGW FQDN (block 630). For example, in implementations described above in connection with FIG. 3, MME 132 may compare PGW FQDNs 350 (e.g., received from DNS server 160) with a FQDN associated with a SGW (e.g., SGW 134). In one example, the SGW FQDN may be stored in a memory (e.g., memory 230) associated with MME 132. In another example, MME 132 may perform a SGW selection procedure that retrieves the SGW FQDN and stores the SGW FQDN in a memory of MME 132.

Process block 565 may include the process blocks depicted in FIG. 7. As shown in FIG. 7, process block 565 may include receiving an indication that the primary PGW is unavailable (block 700), selecting one of the backup PGWs to replace the primary PGW (block 710), and providing an IP address of the selected backup PGW to the UE, where the UE connects to the selected backup PGW based on the selected backup PGW IP address (block 720). For example, in implementations described above in connection with FIG. 3, if the primary PGW 136 is unavailable (e.g., based on an indication received by MME 132), particular PGW IP address 380 may include an IP address of one of the backup PGWs 136. MME 132 may select one of the backup PGWs 136 to replace the primary PGW 136, and may provide the IP address of the selected backup PGW 136 to UE 110. UE 110 may connect to the selected backup PGW 136 based on the IP address of the selected backup PGW 136.

Systems and/or methods described herein may provide PGW diversity for LTE (or eHRPD) networks during dynamic selection of PGWs for PDN connection requests. The systems and/or methods may enable a MME (or a HSGW) to select more than one PGW IP address during UE attachment. The systems and/or methods may prevent PGW attachment failure by providing additional redundancy and diversity during the PGW selection procedure.

The foregoing description of implementations provides illustration and description, but is not intended to be exhaustive or to limit the invention to the precise form disclosed. Modifications and variations are possible in light of the above teachings or may be acquired from practice of the invention. For example, any of the functions described herein as being be performed by MME 132 may be performed by a HSGW if LTE network 120 is replaced with an eHRPD network.

Furthermore, while a series of blocks has been described with regard to FIGS. 5A-7, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as a "component" or as "logic" that performs one or more functions. This component or logic may include hardware, such as an ASIC or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
   receiving, by the computing device, a packet data network (PDN) connection request from a user equipment (UE);
   exchanging, by the computing device and with a home subscriber server (HSS), authentication and authorization information associated with the UE;
   constructing, by the computing device, an access point name (APN) fully qualified domain name (FQDN) based on the authentication and authorization information;
   sending, by the computing device, a query to a domain name system (DNS) server, wherein the query includes the APN FQDN;
   receiving, by the computing device and from the DNS server, PDN gateway (PGW) FQDNs that contain the APN FQDN;
   comparing, by the computing device, the PGW FQDNs with a FQDN associated with a serving gateway (SGW);
   determining, by the computing device and based on the comparison, a PGW, associated with a PGW FQDN that is a closest match to the FQDN associated with the SGW, to be a primary PGW for the PDN connection request;
   determining, by the computing device and based on the comparison, one or more PGWs, residing within a particular distance of the SGW, to be one or more backup PGWs for the PDN connection request, wherein the computing device comprises a mobility management entity (MME) for which no direct signaling exists with respect to the primary PGW and the one or more backup PGWs;

sending, to the DNS server, queries based on FQDNs associated with the primary PGW and the one or more backup PGWs;

receiving, from the DNS server and based on the queries, Internet protocol (IP) addresses that match the FQDNs associated with the primary PGW and the one or more backup PGWs;

storing, in a memory of the computing device, the IP addresses corresponding to the primary PGW and the one or more backup PGWs that the UE is allowed to access;

receiving, at the computing device, an indication that the primary PGW is unavailable; and selecting, responsive to the indication, one of the one or more backup PGWs.

2. The computing device-implemented method of claim 1, further comprising:

providing the IP address of the selected backup PGW to the UE for accessing the selected backup PGW.

3. The computing device-implemented method of claim 1, where the FQDN associated with the SGW is retrieved from a memory associated with the computing device.

4. The computing device-implemented method of claim 1, further comprising:

performing a SGW selection procedure; and receiving the FQDN associated with the SGW based on the SGW selection procedure.

5. The computing device-implemented method of claim 1, wherein the computing device does not determine an availability of the primary PGW and the one or more backup PGWs.

6. The computing device-implemented method of claim 1, where the query includes a name authority pointer (NAPTR) query.

7. The computing device-implemented method of claim 1, where each of the PGW FQDNs includes information identifying a physical location of a particular PGW.

8. The computing device-implemented method of claim 7, where the physical location includes an area, a sub-area, and a mobile telephone switching office (MTSO) location of the particular PGW.

9. A device, comprising:

a memory to store a plurality of instructions; and a processor to execute instructions in the memory to:

receive a packet data network (PDN) connection request from a user equipment (UE), receive, from a home subscriber server (HSS), profile data associated with the UE, create an access point name (APN) fully qualified domain name (FQDN) based on the profile data associated with the UE, send a query, that includes the APN FQDN, to a domain name system (DNS) server, receive, from the DNS server, PDN gateway (PGW) FQDNs that contain the APN FQDN, determine a PGW, associated with a PGW FQDN that is a closest match to a FQDN associated with a serving gateway (SGW), to be a primary PGW for the PDN connection request, determine one or more PGWs, residing within a particular distance of the SGW, to be one or more backup PGWs for the PDN connection request, wherein the device comprises a mobility management entity (MME) for which no direct signaling exists with respect to the primary PGW and the one or more backup PGWs, send, to the DNS server, queries based on FQDNs associated with the primary PGW and the one or more backup PGWs, receive, from the DNS server and based on the queries, Internet protocol (IP) addresses that match the FQDNs associated with the primary PGW and the one or more backup PGWs, wherein at least one of the primary PGW or the one or more backup PGWs are unavailable, and store, in the memory, the IP addresses irrespective of an availability of the primary PGW and the one or more backup PGWs.

10. The device of claim 9, wherein the processor is further to execute instructions in the memory to:

provide, when the primary PGW is available, an IP address of the primary PGW to the UE, where the UE connects to the primary PGW based on the IP address of the primary PGW.

11. The device of claim 10, where the processor is further to execute instructions in the memory to:

receive an indication that the primary PGW is unavailable, select one of the one or more backup PGWs to replace the primary PGW, and provide an IP address of the selected backup PGW to the UE, where the UE connects to the selected backup PGW based on the IP address of the selected backup PGW.

12. The device of claim 10, where the processor is further to execute instructions in the memory to:

provide, when the primary PGW is unavailable, an IP address of a backup PGW to the UE, where the UE connects to the backup PGW based on the IP address of the backup PGW.

13. The device of claim 9, where the FQDN associated with the SGW is retrieved from a memory associated with the device.

14. The device of claim 9, where the processor is further to execute instructions in the memory to:

perform a SGW selection procedure, and receive the FQDN associated with the SGW based on the SGW selection procedure.

15. The device of claim 9, where the query includes a name authority pointer (NAPTR) query.

16. The device of claim 9, where each of the PGW FQDNs includes information identifying a physical location of a particular PGW.

17. The device of claim 16, where the physical location includes an area, a sub-area, and a mobile telephone switching office (MTSO) location of the particular PGW.

* * * * *